UNITED STATES PATENT OFFICE.

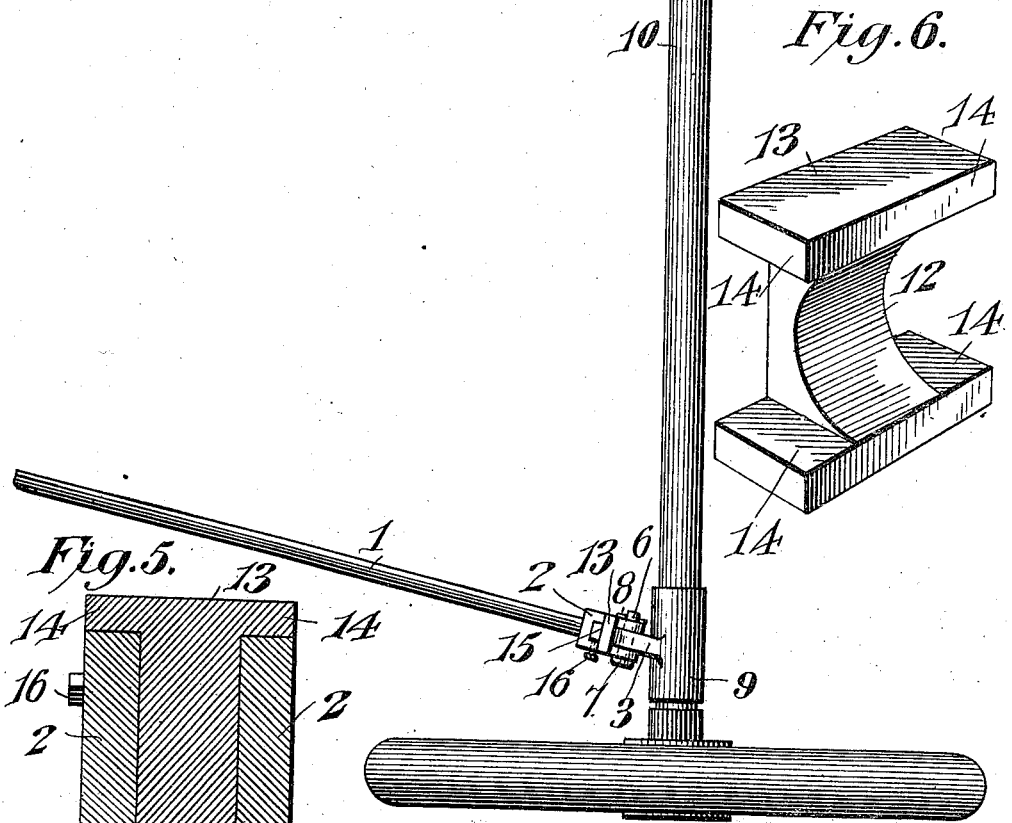

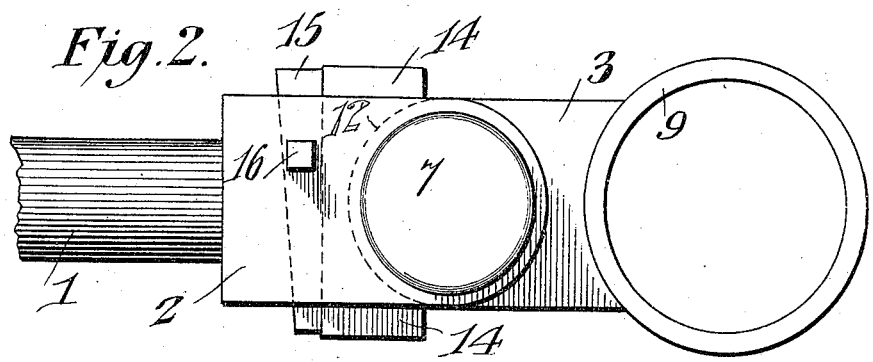
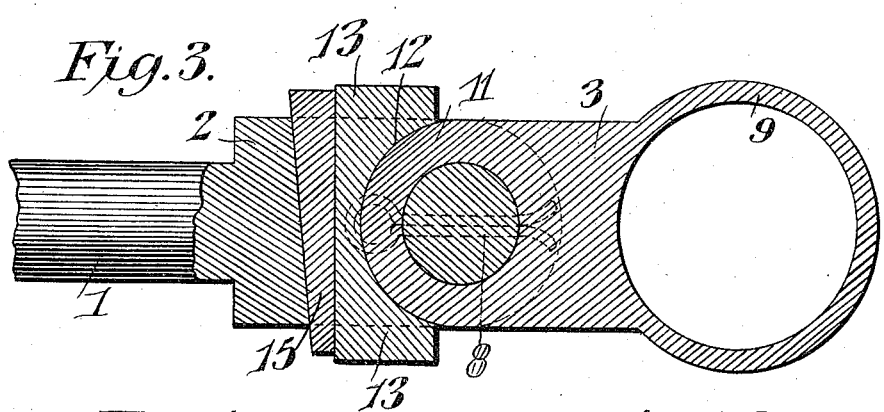
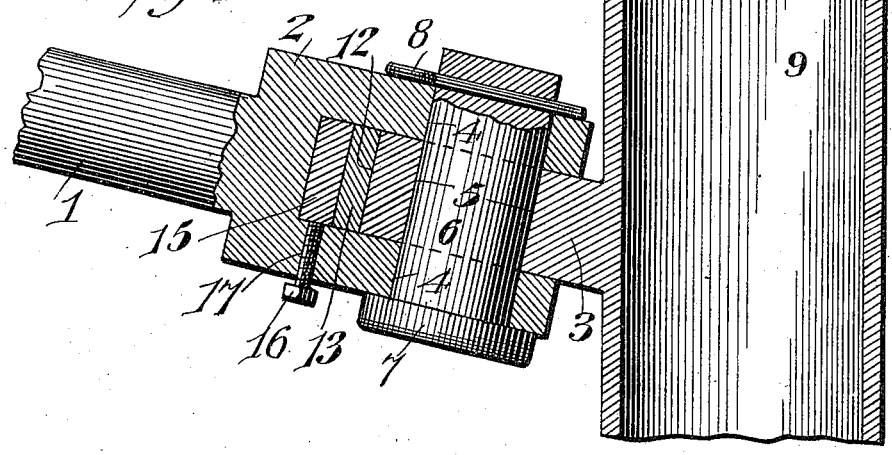

SAMUEL J. PEARSON, OF BENNETTSVILLE, SOUTH CAROLINA, ASSIGNOR OF ONE-HALF TO JOHN M. BRASINGTON, OF BENNETTSVILLE, SOUTH CAROLINA.

JOINT OR COUPLING FOR VEHICLES, REACHES, &c.

963,937.  Specification of Letters Patent.  Patented July 12, 1910.

Application filed July 3, 1908. Serial No. 441,850.

*To all whom it may concern:*

Be it known that I, SAMUEL J. PEARSON, a citizen of the United States, residing at Bennettsville, in the county of Marlboro and State of South Carolina, have invented a new and useful Joint or Coupling for Vehicles, Reaches, &c., of which the following is a specification.

The invention relates to improvements in joints or couplings for automobiles, agricultural and other machines, and the like.

The object of the present invention is to provide a simple, inexpensive and efficient joint, designed for use on the reaches of automobiles, agricultural and other machines, and various other constructions, and adapted to enable wear of the parts to be readily taken up to prevent looseness of the joints and lost motion.

With these and other objects in view, the invention consists in the construction and novel combination of parts hereinafter fully described, illustrated in the accompanying drawings, and pointed out in the claim hereto appended; it being understood that various changes in the form, proportion, size and minor details of construction, within the scope of the claim, may be resorted to without departing from the spirit or sacrificing any of the advantages of the invention.

In the drawings:—Figure 1 is a plan view of a portion of an automobile frame provided with a joint, constructed in accordance with this invention. Fig. 2 is a side elevation of the joint. Fig. 3 is a vertical longitudinal sectional view of the same. Fig. 4 is a horizontal sectional view. Fig. 5 is a transverse sectional view, illustrating the manner of slidably interlocking the adjustable bearing block with the bifurcated member of the joint. Fig. 6 is a detail perspective view of the adjustable bearing block.

Like numerals of reference designate corresponding parts in all the figures of the drawings.

1 designates a reach rod or member provided with an enlarged forked or bifurcated portion 2, constituting one member of the joint and receiving an arm or member 3, which constitutes the other member of the joint. The forked or bifurcated portion 2, which is provided with spaced parallel sides, receives the member 3, which has flat side faces to fit against the inner faces of the sides of the head or bifurcation 2 of the rod or member 1. The sides formed by the bifurcation are provided with opposite openings or perforations 4, which register with a corresponding perforation or opening 5 of the member 3, the two members being connected by a transverse coupling pin 6. The coupling pin is provided at one side of the joint with a head 7, and it is secured in the openings of the members of the joint by means of a split or spring key 8, located at the other side of the joint and extending through a perforation of the coupling pin 6. The side faces of the arms and the inner faces of the sides, formed by the said bifurcation, are vertical, and the transverse coupling or pivot pin permits only a vertical movement of the rear axle.

The arm or member 3 is formed integral with a cuff 9, which embraces the axle 10. The arm or member 3, which is rigid with the cuff, is arranged at an acute angle to the inner portion of the same when the reach rods are diagonally disposed, as illustrated in Fig. 1 of the accompanying drawings, but the arms may be perpendicular to the longitudinal axis of the cuff to correspond with parallel reach rods, or they may form a part of any other member of the frame or machine. Although I have illustrated in the accompanying drawings a portion of an automobile frame equipped with the joint, yet it will be readily understood that the joint is applicable to various constructions liable to become worn and requiring a tight joint. The joint is adapted for use in various constructions subjected to vibration and wear incident to the vibration of an engine, or to that of a vehicle or machine passing over rough roads, or joints subjected to vibration or wear from any other cause.

The end 11 of the arm or member 3 is rounded and fits within a concave recess 12 of a bearing block 13, extending through the bifurcation of the other member of the joint and arranged between the arm or member 3 and the inner end of the bifurcation. The bearing block is introduced into the slot or bifurcation in assembling the parts before the arm or member 3 is placed in position, and it is provided at its top and bottom with laterally projecting terminal arms 14, arranged in pairs and extending beyond the slot or recess of the bifurcation. The laterally projecting arms or lugs are spaced apart to receive the spaced sides of the bifurcated member of the joint, and they are arranged to engage the upper and lower edges of the member 1 at opposite sides of the bifurcation. This construction slidably interlocks the bearing block to the bifurcated member and prevents the former from dropping through the latter while adjusting the parts.

The bearing block is adjusted inwardly to take up the wear by means of a tapering or wedge-shaped key 15, interposed between the bearing block and the wall at the inner end of the bifurcation and adapted to be driven into the latter to force the bearing block tightly against the arm or rounded member of the joint. The tapering or wedge-shaped key, which may be secured in its adjustment by any suitable means, is preferably held in place by means of a transverse set screw 16, piercing one of the sides of the bifurcated member and engaging the adjacent side faces of the key. The slotted or bifurcated member is provided with a threaded perforation 17 for the reception of the set screw 16, which is provided with a polygonal head to enable it to be operated by a wrench or other suitable tool.

Having thus fully described my invention, what I claim as new and desire to secure by Letters Patent, is:—

The combination with the rear axle of a vehicle, of a pair of cuffs provided with integral forwardly converging diagonally arranged arms, forwardly converging reach rods having bifurcated rear ends receiving the arms, horizontal pivots piercing the bifurcated ends of the reach rods and the said arms and permitting only a vertical movement of the rear axle, bearing blocks arranged in the bifurcations of the reach rods and interlocked with the same and engaging the said arms, wedges also arranged in the bifurcations and engaging the bearing blocks to maintain the same tightly against the arms of the said cuffs, and fastening means for rigidly securing the wedges in their adjustment.

In testimony, that I claim the foregoing as my own, I have hereto affixed my signature in the presence of two witnesses.

SAMUEL J. PEARSON.

Witnesses:
 W. D. SMITH,
 JULIAN MCLAUREN.